(12) United States Patent
Chung et al.

(10) Patent No.: US 8,167,477 B2
(45) Date of Patent: May 1, 2012

(54) BACKLIGHT ASSEMBLY INCLUDING LAMP SOCKET WITH ELASTOMERIC CONDUCTOR

(75) Inventors: Du-Hwan Chung, Suwon-si (KR);
Joo-Woan Cho, Asan-si (KR);
Seong-Sik Choi, Seoul (KR); Yong-Woo Lee, Suwon-si (KR); Hyun-Chul Bae, Cheonan-si (KR); Cheol-Yong Noh, Asan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 45 days.

(21) Appl. No.: 13/035,510

(22) Filed: Feb. 25, 2011

(65) Prior Publication Data

US 2011/0149557 A1     Jun. 23, 2011

Related U.S. Application Data

(62) Division of application No. 12/175,847, filed on Jul. 18, 2008.

(30) Foreign Application Priority Data

Jul. 20, 2007    (KR) .................. 10-2007-0072687

(51) Int. Cl.
*H01R 33/02* (2006.01)
*H01R 33/90* (2006.01)
*H01R 33/975* (2006.01)

(52) U.S. Cl. .......... 362/652; 362/657; 362/658; 439/86; 439/232; 439/239; 439/241; 439/244

(58) Field of Classification Search ................. 362/652, 362/657, 658; 439/86, 232, 239, 241, 244
See application file for complete search history.

(56) References Cited

U.S. PATENT DOCUMENTS

| | | | | | |
|---|---|---|---|---|---|
| 2,338,835 | A | * | 1/1944 | Bryant ................... | 362/217.17 |
| 3,639,887 | A | * | 2/1972 | Johnson et al. ............ | 439/239 |
| 4,008,300 | A | * | 2/1977 | Ponn ......................... | 264/104 |
| 4,449,774 | A | * | 5/1984 | Takashi et al. .............. | 439/590 |
| 4,639,062 | A | * | 1/1987 | Taniguchi et al. .......... | 439/586 |
| 5,720,625 | A | * | 2/1998 | Albeck et al. ............... | 439/395 |
| 2006/0202622 | A1 | * | 9/2006 | Lung et al. ................. | 313/623 |

FOREIGN PATENT DOCUMENTS

| | | |
|---|---|---|
| CN | 1945786 | 4/2007 |
| JP | 10334968 | 12/1998 |

* cited by examiner

*Primary Examiner* — Ismael Negron
(74) *Attorney, Agent, or Firm* — F. Chau & Associates, LLC

(57) ABSTRACT

A lamp socket includes a body receiving a lamp, and a power supplying member disposed inside the body, the power supplying member a conductive elastomer, the power supplying member electrically interconnecting the lamp and an inverter substrate on which an inverter is mounted. The power supplying member includes a lamp connector receiving a lead wire of the lamp, and an inverter connector formed integrally with the lamp connector, wherein the inverter connector receives a protrusion of the inverter substrate to encircle the protrusion.

17 Claims, 15 Drawing Sheets

BACKLIGHT ASSEMBLY INCLUDING LAMP SOCKET WITH ELASTOMERIC CONDUCTOR

CROSS-REFERENCE TO RELATED APPLICATION

This application is a Divisional Application of U.S. patent application Ser. No. 12/175,847 filed on Jul. 18, 2008 which claims priority from Korean Patent Application No. 10-2007-0072687, filed on Jul. 20, 2007, the entire contents of which are incorporated herein by reference in their entirety.

BACKGROUND OF THE INVENTION (a) Technical Field

The present disclosure relates to a backlight assembly, an assembling method thereof and a liquid crystal display device including the backlight assembly, and more particularly, to a backlight assembly, an assembling method thereof and a liquid crystal display device including the backlight assembly, wherein the backlight assembly includes a lamp socket for use in a direct type lamp.

(b) Discussion of Related Art

Various electronic devices including, for example, mobile communication terminals, digital cameras, notebook computers, and monitors comprise a display device for displaying images. A liquid crystal display (LCD) device displays images using the electric and optical characteristics of liquid crystal. The LCD device is thinner and lighter as compared to other display devices, and is operated with lower driving voltages. The LCD device consumes less power as compared to other display devices.

The LCD device includes an LCD panel for displaying images, a driving circuit for driving the LCD panel, a backlight assembly for supplying light to the LCD panel. A lamp for a direct type backlight assembly is fixedly mounted to a lamp socket. A lamp lead wire to which a wire is soldered is coupled to the lamp socket, and then the lamp lead wire is connected to an inverter using an inverter connector. The lamp lead wire and the wire are manually soldered to each other. A process including, for example, fastening of the lamp lead wire to the lamp socket and the coupling of the connectors is also performed. Fixing the lamp to the lamp socket manually is an inefficient and time consuming process that increases manufacturing costs.

SUMMARY OF THE INVENTION

According to an exemplary embodiment of the present invention, a lamp socket comprises a body receiving a lamp, and a power supplying member disposed inside the body, the power supplying member comprising an electrical conductive material having elasticity, wherein the power supplying member electrically interconnects the lamp and an inverter substrate on which an inverter is mounted, wherein the power supplying member includes a lamp connector receiving a lead wire of the lamp and an inverter connector formed integrally with the lamp connector, wherein the inverter connector receives a protrusion of the inverter substrate to encircle the protrusion.

The power supplying member may comprise an elastomer including a silicon compound and a carbon material.

According to an exemplary embodiment of the present invention, a backlight assembly comprises a lamp, an inverter mounted on an inverter substrate, wherein the inverter has a protrusion and the inverter supplies power to the lamp, a lamp socket including a body receiving the lamp and a power supplying member disposed inside the body, wherein the power supplying member comprises a conductive material having elasticity to electrically interconnect the lamp and the inverter substrate, and a bottom chassis including a mounting recess for receiving the lamp socket.

The power supplying member may comprise a pair of coupling projections coupled to the body, and a lamp connector connected with a lead wire of the lamp.

The lamp connector may comprise a fitting portion allowing the lamp lead wire to be fit therein, a fixing groove receiving the lamp lead wire, and a connection passageway positioned between the fitting portion and the fixing groove to guide the lamp lead wire from the fitting portion into the fixing groove.

The width of the connection passageway can be smaller than that of the fixing groove.

The width of the connection passageway can be smaller than that of the lamp lead wire by about 0.25 mm to about 0.35 mm, and the width of the fixing groove can be smaller than that of the lamp lead wire by about 0.1 mm to about 0.2 mm.

The power supplying member may further comprise an inverter connector formed integrally with the lamp connector and connected to the protrusion of the inverter substrate.

The inverter connector may fix the protrusion of the inverter substrate by encircling the protrusion.

The inverter connector may comprise an entrance portion receiving the protrusion of the inverter substrate, and a concave groove formed inside the inverter connector having a spring therein for holding the inverter substrate.

The power supplying member may comprise a chassis connector connected to the lamp connector and the bottom chassis.

The body may comprise a pair of coupling indents coupled to the pair of coupling projections of the power supplying member, a lamp support portion having a holding groove formed therein for mounting a part of the lamp, and a protective portion connected to the lamp support portion encircling the lamp connector.

The body may further comprise an inverter support portion extending integrally downwardly from the protective portion, the inverter support portion encircling the inverter connector.

The body may comprise silicon rubber or polycarbonate.

The lamp can be formed in a 'U' shape, and may comprise a lamp lead wire connected at one side to the power supplying member of the lamp socket and a bent portion formed at the other side of the lamp lead wire in a round shape.

The backlight assembly may further comprise a movement-preventing member including a fitting hole formed at an upper portion and a support stand formed at a lower portion thereof.

The lamp can be formed in a linear shape, and may comprise a first lamp lead wire connected to the inverter and a second lamp lead wire connected to the bottom chassis, the second lamp lead wire being disposed opposite to the first lamp lead wire.

The backlight assembly may further comprise side molds including a plurality of grooves formed on an inner wall thereof to fix the lamp.

According to an exemplary embodiment of the present invention, a method of assembling a backlight light assembly comprises providing a bottom chassis, an inverter substrate, a lamp, a lamp socket and an optical sheet element, mounting the lamp socket to a mounting recess formed at a side of a bottom portion of the bottom chassis, inserting the lamp into a body of the lamp socket and inserting a lamp lead wire of the lamp into a lamp connector of the lamp socket, inserting a protrusion of the inverter substrate into an inverter connector of the lamp socket connected to the lamp connector of the lamp socket, coupling a side mold to the lamp socket to encircle the lamp socket, and mounting the optical sheet element on the side mold.

The step of inserting the lamp lead wire of the lamp into the lamp connector may further comprise the steps of widening a width of a connection passageway and a fixing groove of the lamp connector using a tool disposed at a fitting portion of the lamp connector, coupling the lamp lead wire to the fixing groove, and removing the tool from the fitting portion.

BRIEF DESCRIPTION OF THE DRAWINGS

Exemplary embodiments of the present invention can be understood in more detail from the following descriptions taken in conjunction with the accompanying drawings, in which.

DETAILED DESCRIPTION OF EXEMPLARY EMBODIMENTS

The present invention is described more fully hereinafter with reference to the accompanying drawings, in which exemplary embodiments of the invention are shown. The present invention may, however, be embodied in many different forms and should not be construed as limited to the embodiments set forth herein.

Figure 1:
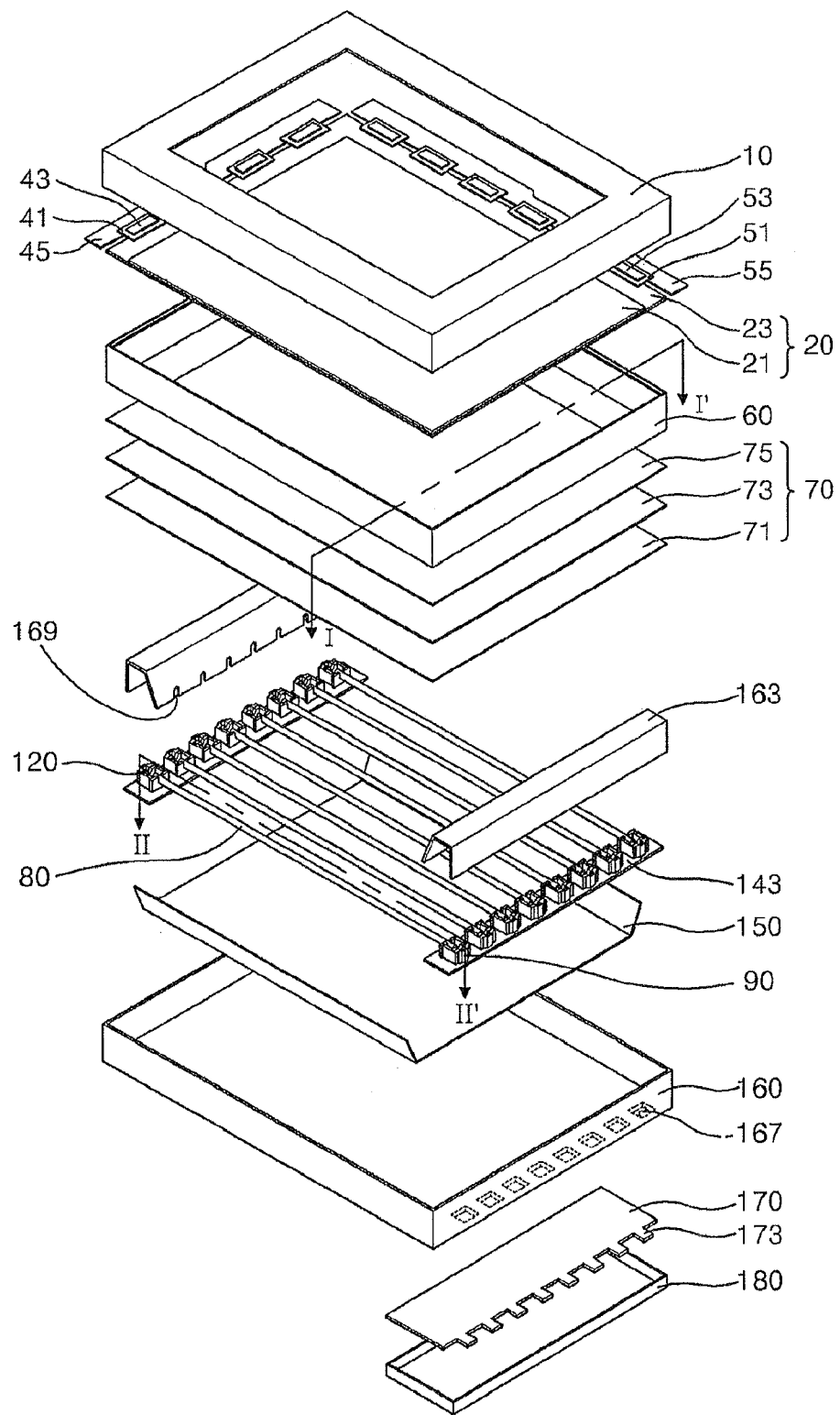
FIG. 1 is an exploded perspective view showing a liquid crystal display device according to an exemplary embodiment of the present invention.
Figure 2:
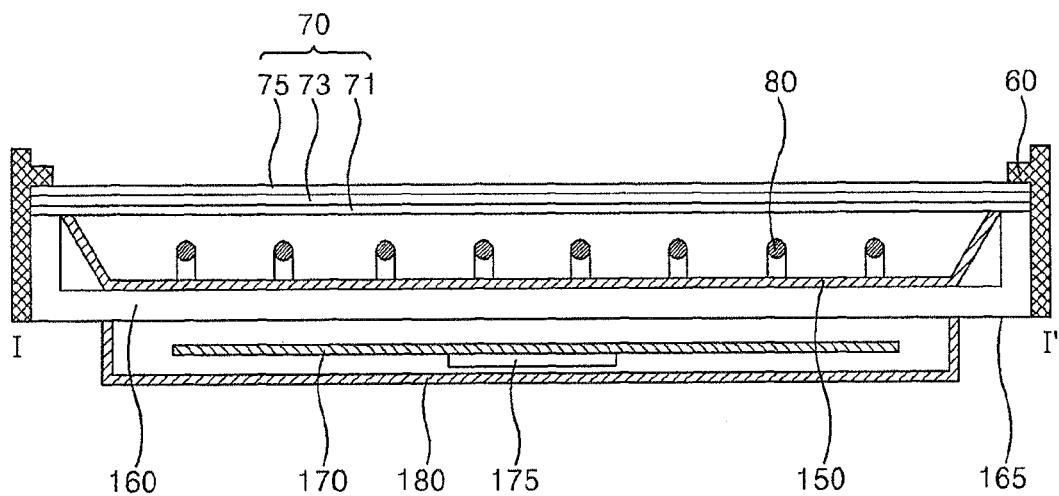
FIG. 2 is a cross-sectional view showing a backlight assembly and an inverter substrate taken along the line I-I' shown in FIG. 1.

FIG. 1 is an exploded perspective view showing a liquid crystal display (LCD) device according to an exemplary embodiment of the present invention, and FIG. 2 is a cross-sectional view showing a backlight assembly and an inverter substrate taken along the line I-II' shown in FIG. 1.

Referring to FIGS. 1 and 2, the LCD device 300 includes a top chassis 10, an LCD panel 20, a driving circuit, a backlight assembly and an inverter 175.

The top chassis 10 is disposed on the top surface of the LCD panel 20, and protects the LCD panel 20 and the backlight assembly from an external impact. The top chassis 10 has an opening formed at the center thereof to expose a display region of the LCD panel 20 therethrough.

The LCD panel 20 includes a color filter substrate 21, a thin film transistor (TFT) substrate 23 and a liquid crystal layer interposed between the color filter substrate 21 and the TFT substrate 23.

The color filter substrate 21 includes a black matrix formed on an upper substrate comprising glass or plastic to shield light, and an array of red, green and blue color filters formed in regions partitioned by the black matrix to implement a desired color. The color filter substrate 21 includes a common electrode for applying a common voltage to the liquid crystal layer, and an upper alignment film coated on the common electrode to align liquid crystal molecules.

The TFT substrate 23 includes, a number of data lines and a number of gate lines formed between a lower substrate and a gate insulating film to intersect each other, and a number of TFTs connected to the data lines and gate lines. The lower substrate can comprise glass or plastic. The TFT substrate 23 includes a pixel electrode for applying a pixel voltage to the liquid crystal layer and a lower alignment film coated on the pixel electrode to align liquid crystal molecules.

The driving circuit includes a gate driver integrated circuit (IC) 43 for driving the gate lines of the LCD panel 20 and a data driver integrated circuit (IC) 53 for driving the data lines. The driving circuit includes a timing controller, a power supply unit and various circuit devices, and generates signals used for displaying images. The timing controller, the power supply unit and the various circuit devices are attached to printed circuit boards (PCBs) 45 and 55.

Various signal circuits formed on the gate integrated circuit 45 and the data integrated circuit 55 are electrically connected to the gate lines and the data lines using, for example, a gate tape carrier package (TCP) 41 and a data tape carrier package 51.

The backlight assembly includes a mold frame 60, an optical sheet element 70, lamps 80, first and second lamp sockets 90 and 120, side molds 163, a reflective sheet 150 and a bottom chassis 160.

The mold frame 60 protects the optical sheet element 70, the lamps 80, the first and second lamp sockets 90 and 120 and the reflective sheet 150 from an external impact, and comprises a mold material.

The optical sheet element 70 is disposed behind the LCD panel 20, and improves the luminance of light emitted from the lamps 80 which is incident to the LCD panel 20. The optical sheet element 70 includes a diffusion sheet 71, a prism sheet 73 and a protective sheet 75.

The lamp 80 emits light. In an exemplary embodiment of the present invention, a plurality of the lamps 80 are disposed behind the optical sheet element 70. In an exemplary embodiment, the plurality of lamps 80 can be disposed parallel with the LCD panel 20 to directly transfer the light to the LCD panel 20.

The lamp 80 may be a cold cathode fluorescent lamp (CCFL) or an external electrode fluorescent lamp (EEFL).

The first and second lamp sockets 90 and 120 are fixedly mounted with the lamps 80. An identical number of the first and second lamp sockets 90 and 120, and the lamps 80 can be used. Each of the plurality first and second lamp sockets 90 and 120 is connected to a connection portion 143. The first lamp socket 90 and the second lamp socket 120 are formed in pairs and positioned opposite to each other. The first lamp socket 90 electrically interconnects the lamp 80 and the inverter 175. The second lamp socket 120 is formed at the other side of the lamp 80 coupled to the first lamp socket 90 to interconnect the lamp 80 and the bottom chassis 160.

Each side mold 163 includes a plurality of grooves 169 formed on one side wall thereof to encircle the outer periphery of the lamp 80. Thus, the lamp 80 is securely fixed using the grooves 169 of the side mold 163 to prevent the escape of the lamp 80. The side mold 163 is fastened to the bottom chassis 160 so that the lamp 80 and the optical sheet element 70 are spaced apart from each other by a predetermined interval. The side mold 163 may have a stepped portion formed on the top surface thereof to allow the optical sheet element 70 to be received on the stepped portion.

The reflective sheet 150 employs a plate having a high optical reflectivity. The reflective sheet 150 allows light emitted in an opposite direction to that of light emitted to the LCD panel 20 from the lamp 80 to be re-reflected to the LCD panel 20 to reduce a loss of light. The reflective sheet 150 has a high-reflectivity reflective member coated on a base material.

The bottom chassis 160 internally accommodates the optical sheet element 70, the lamps 80, the lamp sockets 90 and 120 and the reflective sheet 150 to protect them from an external impact. The bottom chassis 160 includes a plurality of mounting recesses 167 at one side of the bottom portion thereof to mount the lamp sockets 90 therein. A same number of the mounting recesses 167 and the lamp sockets 90 can be used.

The inverter 175 provides power to the lamps 80 to emit light, and is mounted on the inverter substrate 170. The inverter substrate 170 is disposed below the bottom portion 165 of the bottom chassis 160. The inverter substrate 170 has a plurality of protrusions 173 contacting the lamp socket 90. The protrusions 173 are electrically connected to the inverter 175 using wirings formed in the inverter substrate 170. A protective cover 180 encircles the inverter substrate 170 and protects the inverter 175 from, for example, external dust or impact. The protective cover 180 may comprise a plastic material.

Figure 3A:
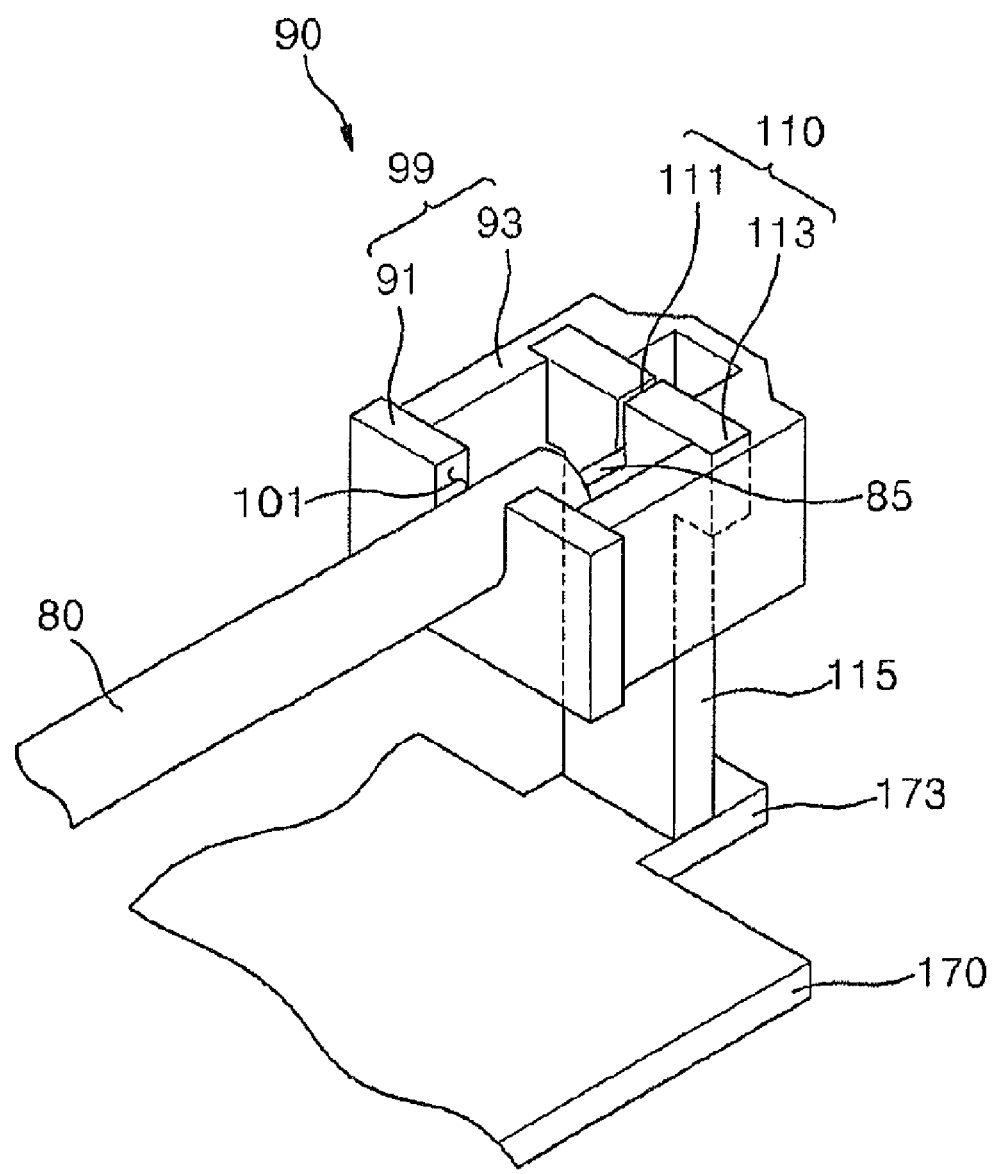
FIG. 3A is a perspective view showing a lamp, a first lamp socket and an inverter substrate according to an exemplary embodiment of the present invention.
Figure 3B:
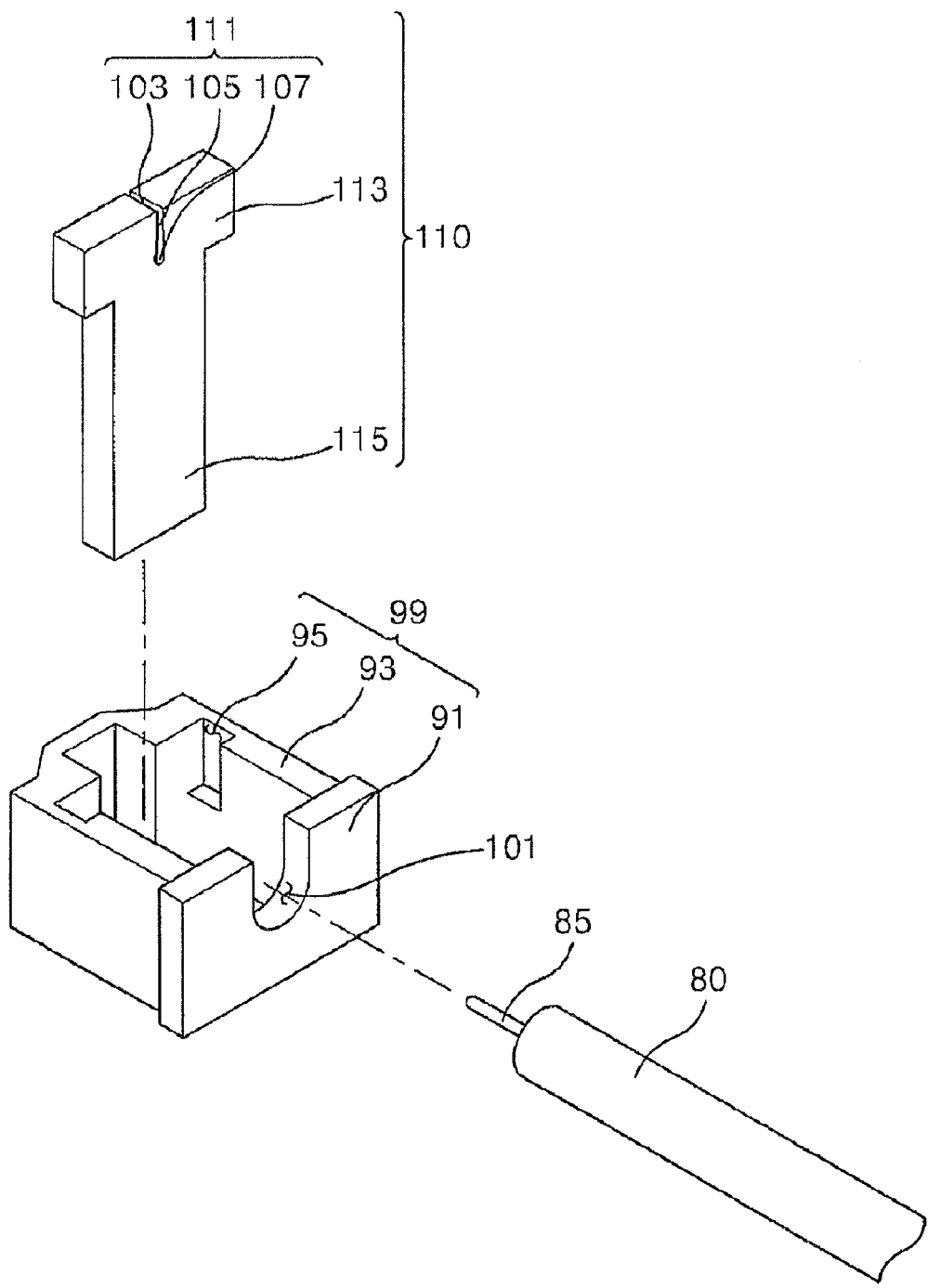
FIG. 3B is an exploded perspective view showing the lamp and the first lamp socket shown in FIG. 3A according to an exemplary embodiment of the present invention.

FIG. 3A is a perspective view showing a lamp, a first lamp socket and an inverter substrate according to an exemplary embodiment of the present invention. FIG. 3B is an exploded perspective view showing a lamp and the first lamp socket shown in FIG. 3A according to an exemplary embodiment of the present invention.

Referring to FIGS. 3A and 3B, the first lamp socket 90 includes a power supplying member 110 and a body 99.

The power supplying member 110 is disposed inside the body 99. The power supplying member 110 comprises an electrical conductive material having elasticity and electrically interconnects the lamp 80 and an inverter substrate 170 on which an inverter is mounted.

Since the lamp 80 and the inverter mounted on the inverter substrate 170 are electrically interconnected using the power supplying member 110, the lamp 80 and the inverter does not need to be manually interconnected. Thus, the time spent for assembling the lamp 80 and the inverter substrate 170 can be shortened. In an exemplary embodiment, the electrical conductive material can be an elastomer comprising a silicon compound and a carbon material.

The power supplying member 110 includes a lamp connector 111, a pair of coupling projections 113 and an inverter connector 115. The power supplying member 110 can be formed in a 'T' shape.

The lamp connector 111 is formed at one side of the power supplying member 110, and allows a lead wire 85 of the lamp 80 to be fixedly inserted thereto. The elastomer of which the lamp connector 111 is made is similar in hardness and specific gravity to rubber and thus has good flexibility. When the lamp lead wire 85 is inserted into the lamp connector 111, the lead wire 85 can be caught by the lamp connector 111 using the elasticity of the rubber itself and can be protected from an external impact.

The lamp connector 111 is formed of an elongated slit opening, and includes a fitting portion 103, a connection passageway 105 and a fixing groove 107.

The first lamp lead wire 85 is inserted into the fitting portion 103. The first lamp lead wire 85 is fixedly received into the fixing groove 107 to be electrically connected to the inverter 175. In an exemplary embodiment, the fixing groove 107 may be formed in a 'U' shape so that the first lamp lead wire 85 can be easily received therein. The connection passageway 105 is formed between the fitting portion 103 and the fixing groove 107 to guide the first lamp lead wire 85 received into the fitting portion 103 to the fixing groove 107.

The coupling projection 113 is formed at both ends of the lamp connector 111 and is coupled to a corresponding coupling indent 95 of the body 99 to enable the power supplying member 110 to be securely fixed to the body 99.

The inverter connector 115 is formed at the other side of the power supplying member 110 and is formed integrally with the lamp connector 111. The inverter connector 115 is connected to the protrusion 173 of the inverter substrate 170 mounted with the inverter.

The body 99 is adapted to fix the lamp 80 and to encircle the outer periphery of the power supplying member 110. The body 99 comprises an insulating material such as a silicon material or a plastic material. In an exemplary embodiment, the silicon material is silicon rubber and the plastic material is polycarbonate.

The body 99 includes a lamp support portion 91, a protective portion and a pair of coupling indents 95.

The lamp support portion 91 has a lamp support groove 101 for receiving a part of the lamp 80 thereon. The lamp support groove 101 may be formed in a 'U' shape to allow the lamp 80 having a circular cross-section to be easily received thereon.

The protective portion 93 is formed integrally with the lamp support portion 91 and encircles the outer periphery of the lamp connector 111.

The pair of coupling indents 95 are formed on the opposing inner walls of protective portion 93 to correspond to the pair of coupling projections 113 of the power supplying member 110. As such the coupling projections 113 are coupled to the coupling indents 95 to prevent any movement of the power supplying member 110.

Figure 4:
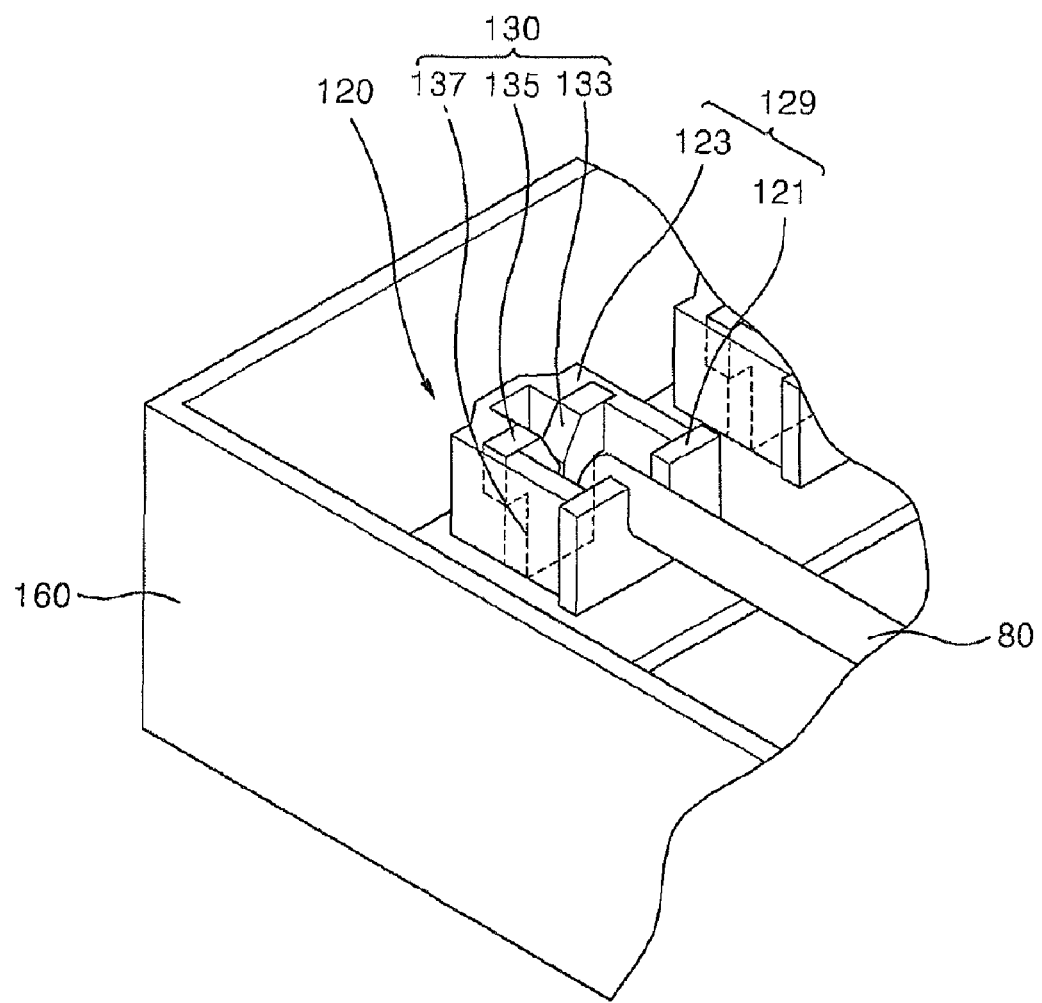
FIG. 4 is a perspective view showing a lamp, a second lamp socket and a bottom chassis according to an exemplary embodiment of the present invention.

FIG. 4 is a perspective view showing a lamp, a second lamp socket and a bottom chassis according to an exemplary embodiment of the present invention.

Referring to FIG. 4, the second lamp socket 120 includes a body 129 for fixing the lamp 80, and a power supplying member 130 disposed inside the body 129. The power supplying member 130 comprises an elastomer as an electrical conductive material having elasticity.

The power supplying member 130 includes a pair of coupling projections 135, a lamp connector 133, and a chassis connector 137.

The coupling projections 135 are formed at both sides of the lamp connector 133 to allow the power supplying member 130 to be securely fixed to the body 129. The lamp connector 133 is formed at one side of the power supplying member 130, and the second lamp lead wire is placed in the lamp connector 133 so that it can be electrically connected to the bottom chassis 160. The chassis connector 137 is formed at the other side of the power supplying member 130 to allow the second lamp lead wire to be electrically connected to the bottom chassis 160.

The body 129 includes a lamp support portion 121, a protective portion 123 and a pair of coupling indents.

Figure 5:
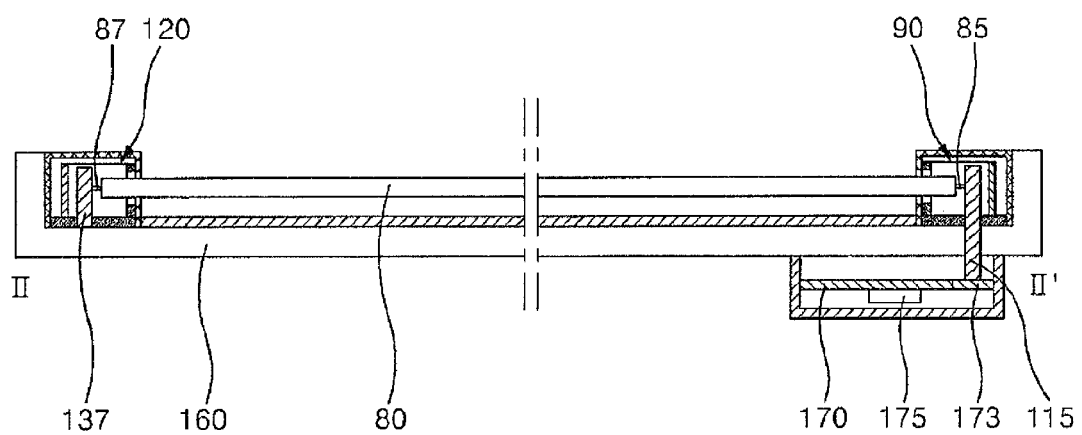
FIG. 5 is a cross-sectional view showing a lamp, first and second lamp sockets, a bottom chassis and an inverter substrate taken along the line II-II' shown in FIG. 1.

FIG. 5 is a cross-sectional view showing a lamp, first and second lamp sockets, a bottom chassis and an inverter substrate taken along the line II-II' shown in FIG. 1 according to an exemplary embodiment of the present invention.

Referring to FIG. 5, the inverter connector 115 of the first lamp socket 90 is connected to the protrusion 173 of the inverter substrate 170 disposed behind the bottom chassis 160 to supply a lamp driving power. The lamp driving power is generated from the inverter 175 to the lamp 80 through the first lamp lead wire 85. The lamp 80 emits light by using the supplied lamp driving power. In an exemplary embodiment, the chassis connector 137 of the second lamp socket 120 is connected to the bottom chassis 160 to serve as a ground.

Figure 6:
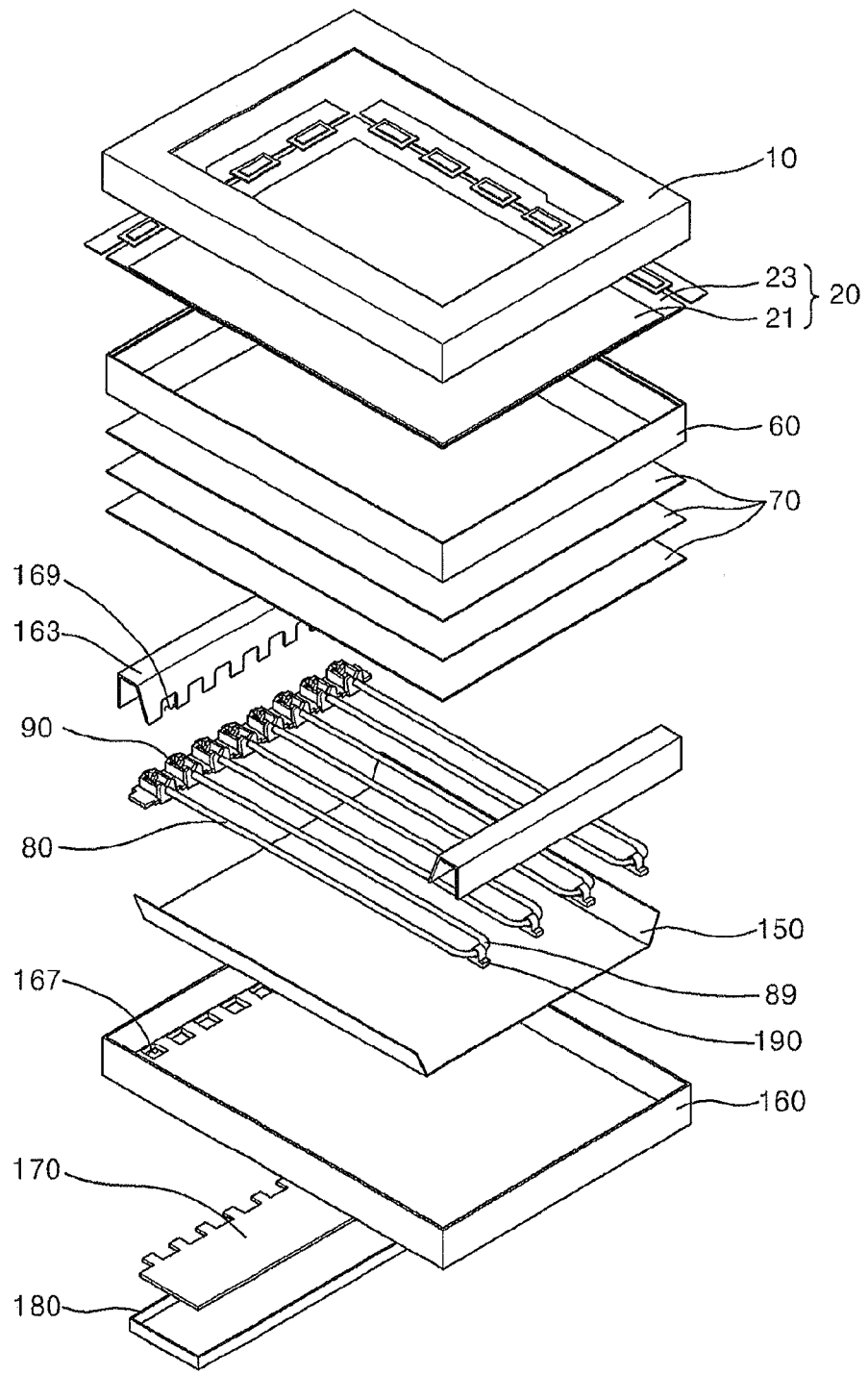
FIG. 6 is an exploded perspective view showing a liquid crystal display device according to an exemplary embodiment of the present invention.

FIG. 6 is an exploded perspective view showing an LCD device according to an exemplary embodiment of the present invention.

Referring to FIG. 6, the LCD device 300 includes a top chassis 10, an LCD panel 20, a driving circuit, a backlight assembly and an inverter.

The backlight assembly includes a lamp 80, a movement-preventing member 190, a lamp socket 90, side molds 163, a mold frame 60, an optical sheet element 70, a reflective sheet 150 and a bottom chassis 160.

The lamp 80 emits light and can be formed in a 'U' shape.

The lamp 80 includes a lamp lead wire mounted at the lamp socket 90 and a bent portion 89 formed at the other side of the lamp lead wire in a round shape. The bent portion 89 is mounted with a movement-preventing member 190 for preventing any movement of the lamp 80 and fastening the lamp 80 to the bottom chassis 160. In an exemplary embodiment, a 'U' shaped lamp 80 is described by way of an example, but a linear lamp may be used.

Figure 7:
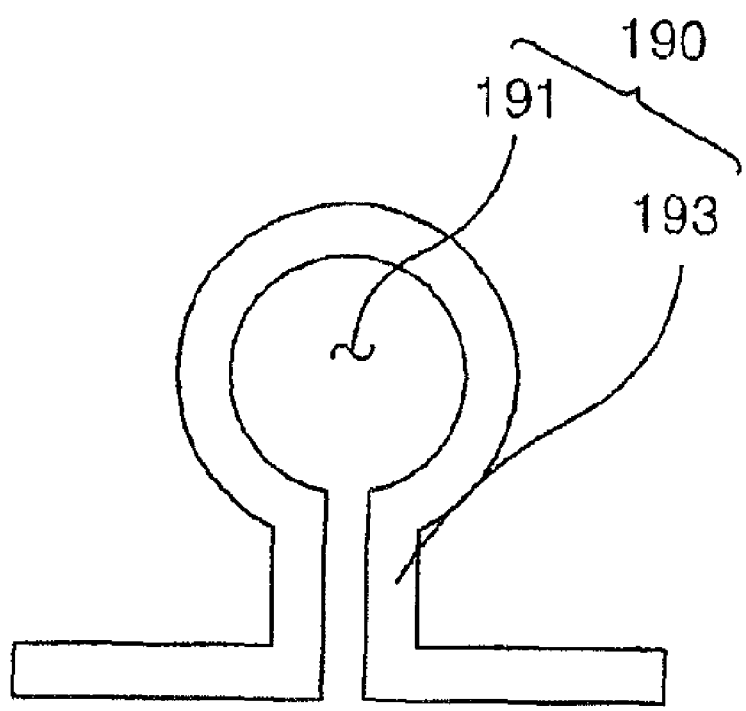
FIG. 7 is a top plan view showing a movement-preventing member according to an exemplary embodiment of the present invention.

Referring to FIG. 7, the movement-preventing member 190 includes a fitting hole 191 formed at an upper portion thereof and a support stand 193 formed at a lower portion thereof. The fitting hole 191 receives the bent portion 89 of the lamp 80 and the support stand 193 is fastened to the bottom chassis 160. The movement-preventing member 190 can prevent the lamp 80 and the lamp lead wire from escaping from the lamp socket 90 due to the movement of the lamp 80. The movement-preventing member 190 may comprise an insulating material. For example, the movement-preventing member 190 may comprise silicon rubber or polycarbonate. Thus, heat generated from the lamp 80 can be transferred to the bottom chassis 160 to prevent the generation of a short circuit.

The lamp socket 90 is fixedly mounted with the lamp 80. The power supplying member 110 of the lamp socket 90 may comprise an elastomer to electrically interconnect the lamp 80 and the inverter. The side mold 163 includes a side wall having a plurality of grooves 169 to encircle the outer periphery of the lamp socket 90.

The mold frame 60 is disposed on the optical sheet element 70 and protects the optical sheet element 70, the lamp 80, the lamp socket 90 and the reflective sheet 140 from an external impact.

The optical sheet element 70 and the reflective sheet 140 change the physical properties of light emitted from the lamp 80 and transfer the light to the LCD panel 20.

The bottom chassis 160 includes a plurality of mounting recesses 167 formed therein to allow the lamp sockets 90 to be mounted therein. The bottom chassis 160 protects the lamp 80, the lamp socket 90, the optical sheet element 70 and the reflective sheet 150 from the external impact.

The top chassis 10 internally accommodates the LCD panel 20, the driving circuit and the backlight assembly and protects them from the external impact.

The LCD panel 20 includes a color filter substrate 21, a TFT substrate 23, and a liquid crystal layer interposed between the color filter substrate 21 and the TFT substrate 23.

The driving circuit drives the LCD panel 20.

The inverter is connected to the lamp socket 90 to provide power to the lamps 80 to emit light, and is mounted on the inverter substrate 170. A protective cover 180 may be provided to prevent the inverter and the inverter substrate 170 from an external impact.

Figure 8A:
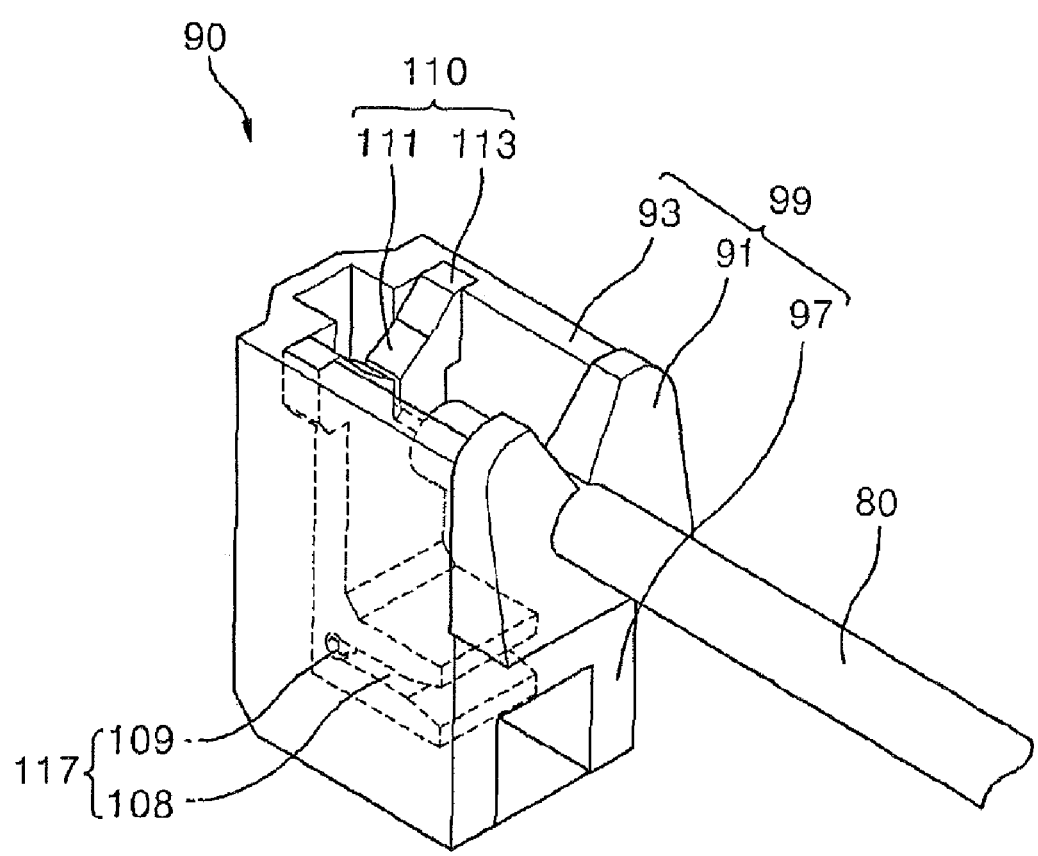
FIG. 8A is a perspective view showing a lamp and a lamp socket according to an exemplary embodiment of the present invention.
Figure 8B:
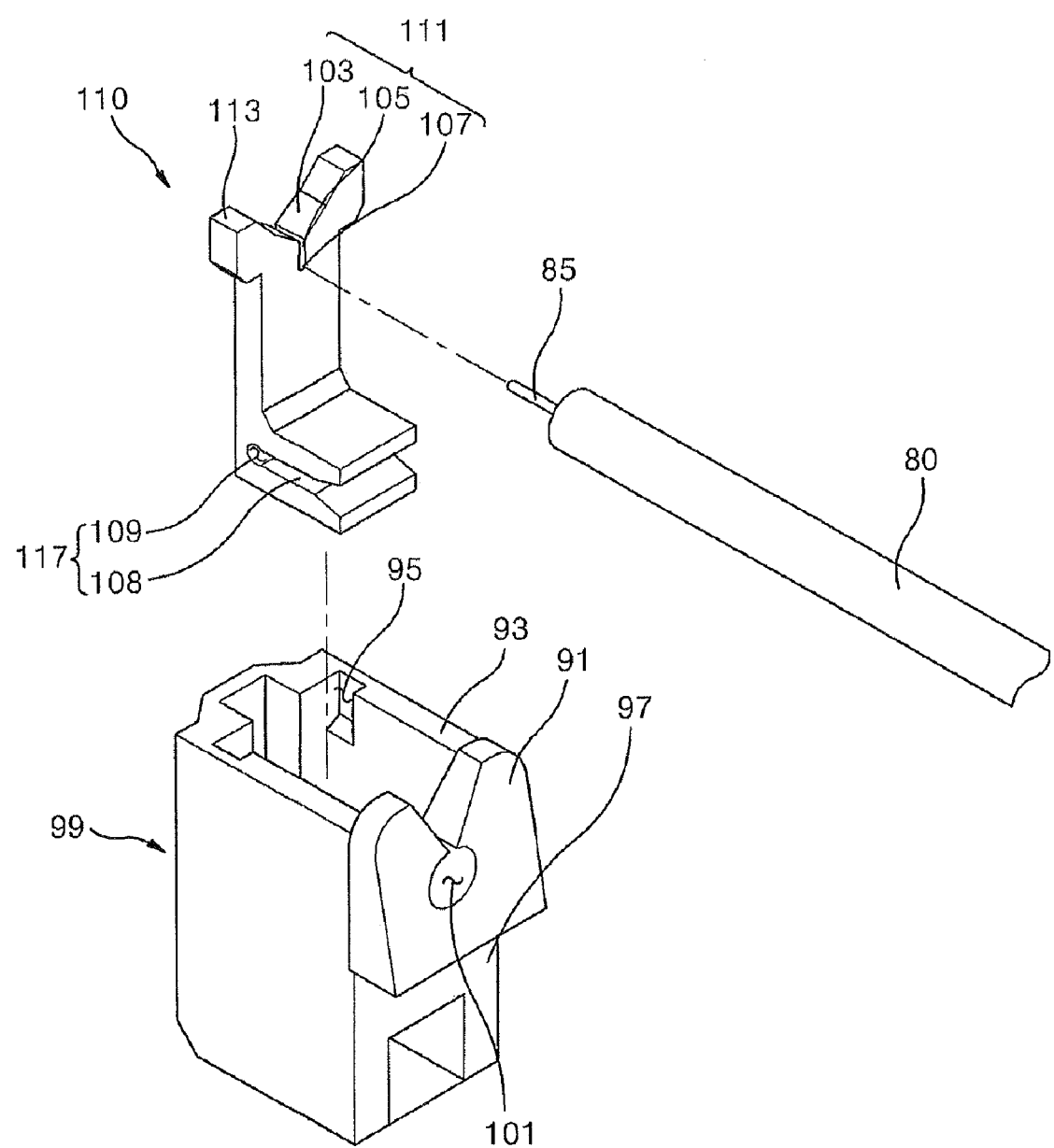
FIG. 8B is an exploded perspective view showing the lamp and the lamp socket shown in FIG. 8A according to an exemplary embodiment of the present invention.

FIG. 8A is an assembled perspective view showing a lamp and a lamp socket according to an exemplary embodiment of the present invention. FIG. 8B is an exploded perspective view showing the lamp and the lamp socket shown in FIG. 8A according to an exemplary embodiment of the present invention.

Referring to FIGS. 8A and 8B, the lamp socket 90 securely fixes the lamp 80, and electrically interconnects the lamp 80 and the inverter. The lamp socket 90 includes a body 99 for securely fixing the lamp 80 and a power supplying member 110 disposed inside the body 99. The power supplying member 110 comprises an elastomer as an electrical conductive material.

The power supplying member 110 includes a lamp connector 111, a pair of coupling projections 113 and an inverter connector 117.

The lamp connector 111 is formed at one side of the power supplying member 110 and allows the lamp lead wire 85 to be fixedly received therein. The lamp connector 111 can be formed in a 'Y' shape, and includes a fitting portion 103, a connection passageway 105 and a fixing groove 107.

The fitting portion 103 receives a lamp lead wire 85, and may be formed, for example, in an inverted triangular shape (i.e. '▼'). A force is applied to an inclined surface of the fitting portion 103 using a tool so that the fitting portion 103 can be widened to insert the lamp lead wire 85 therein without applying any force to the lamp lead wire 85. The lamp lead wire 85 is fixedly received into the fixing groove 107 to allow the lamp to be electrically connected to the inverter 175 using an elastomer as an electrical conductive material. The connection passageway 105 is formed between the fitting portion 103 and the fixing groove 107 to guide the lamp lead wire 85 fit into the fitting portion 103 to the fixing groove 107.

The coupling projection 113 is connected to the lamp connector 111, and is coupled to the body 99 to securely fix the power supplying member 110 to the body 99.

The inverter connector 117 is formed at the other side of the power supplying member 110 to be integrally extended from the lamp connector 111. The inverter connector 117 includes an entrance portion 108 and concave groove 109. The entrance portion 108 allows the protrusion of the inverter substrate 170 to be inserted thereto, and the concave groove 109 is formed integrally with the entrance portion 108.

The body 99 includes a lamp support portion 91, a protective portion 93, a pair of opposing coupling indents 95 and an inverter support portion 97.

The lamp support portion 91 securely fixes the lamp 80, and includes a holding groove 101 for allowing a part of the lamp 80 to be mounted therein. The protective portion 93 is connected to the lamp support portion 91 and encircles the lamp connector 111. The coupling indents 95 are formed at positions corresponding to those of the coupling projections 113 of the lamp connector 111 to couple the coupling projections 113 to the coupling indents 95. The inverter support portion 97 extends integrally downwardly from the protective portion 93 to encircle the inverter connector 117.

Figure 9:
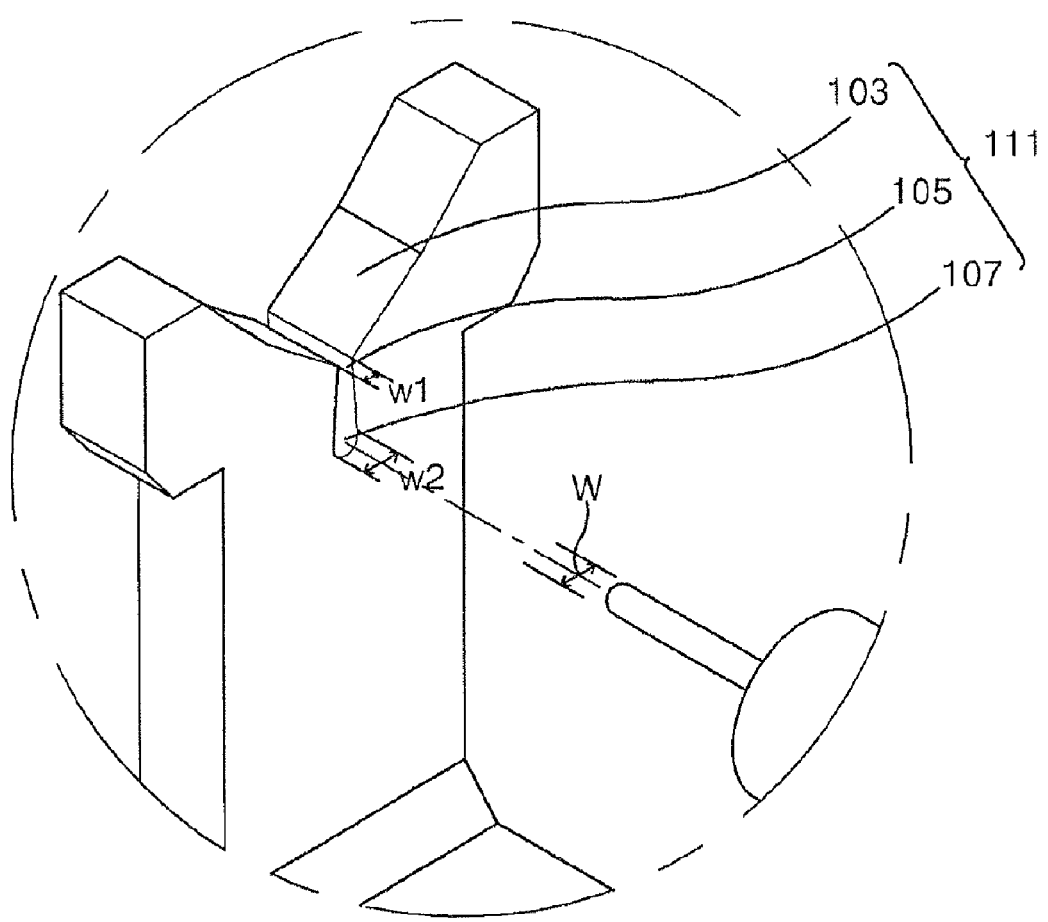
FIG. 9 is an exploded perspective view showing a power supplying member and a lamp lead wire according to an exemplary embodiment of the present invention.

FIG. 9 is an exploded perspective view showing a power supplying member and a lamp lead wire according to an exemplary embodiment of the present invention.

Referring to FIG. 9, the width (w1) of the connection passageway 105 can be smaller than the width (W) of the lamp lead wire 85 by about 0.25 mm to about 0.35 mm. When the width (w1) of the connection passageway 105 is smaller than the width (W) of the lamp lead wire 85 by less than about 0.25 mm, the lamp lead wire 85 may escape from the lamp connector. When the width (w1) of the connection passageway 105 is smaller than the width (W) of the lamp lead wire 85 by more than about 0.35 mm, it is difficult to insert the lamp lead wire 85 into the fitting portion 103.

The width (w2) of the fixing groove 107 can be smaller than the width (W) of the lamp lead wire 85 by about 0.1 mm to about 0.2 mm. When the width (w2) of the fixing groove 107 is smaller than the width (W) of the lamp lead wire 85 by less than about 0.1 mm, the lamp lead wire 85 may escape from the lamp connector. When the width (w2) of the fixing groove 107 is smaller than the width (W) of the lamp lead wire 85 by more than about 0.2 mm, the lamp lead wire 85 cannot be mounted in the fixing groove 107.

The width (w1) of the connection passageway 105 and the width (w2) of the fixing groove 107 are smaller than the width (W) of the lamp lead wire 85 for fitting the lamp to the lamp connector without applying a force to the lamp. For example, if a force is exerted to the lamp 80 or the lamp lead wire 85 during the fitting of the lamp 80, micro-crack may occur in the lamp 80, which results in a leakage of a filling material inside the lamp 80 to the outside. The width (w1) of the connection passageway 105 can be smaller than the width (w2) of the fixing groove 107 for securely fixing the lamp lead wire 85 to prevent the lamp lead wire 85 from escaping from the lamp connector.

Figure 10:
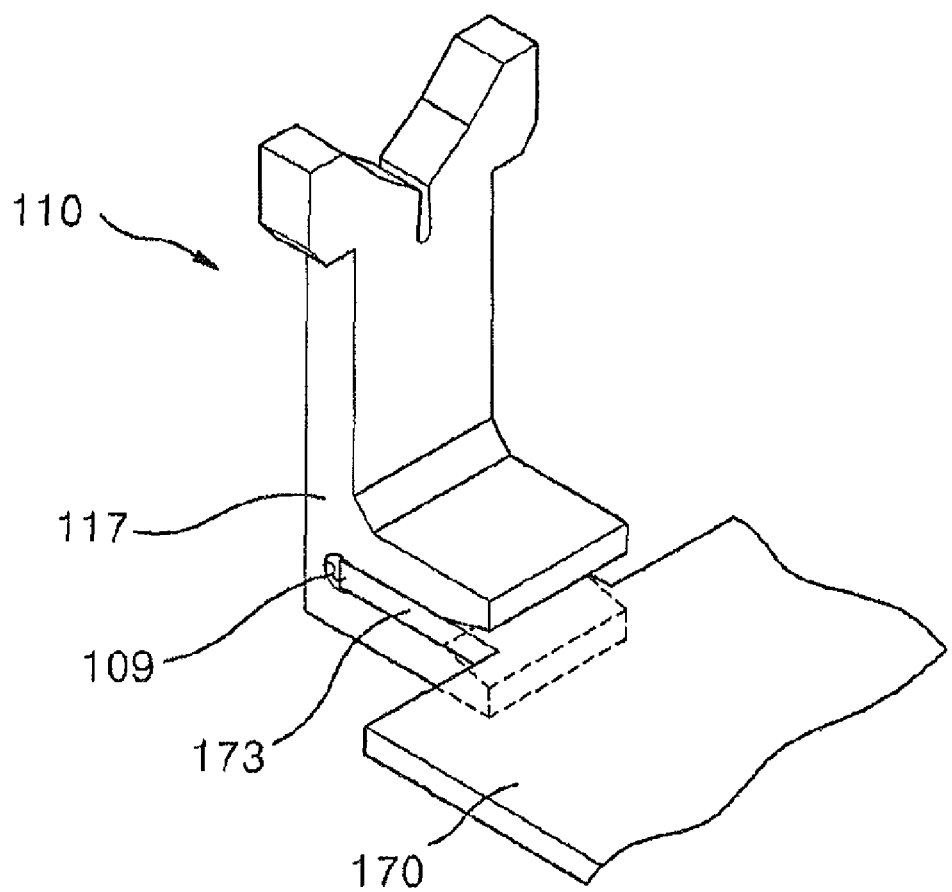
FIG. 10 is a perspective view showing a power supplying member and an inverter substrate according to an exemplary embodiment of the present invention.

FIG. 10 is a perspective view showing a power supplying member and an inverter substrate according to an exemplary embodiment of the present invention.

Referring to FIG. 10, the inverter connector 117 securely fixes the protrusion 173 of the inverter substrate 170 to encircle the protrusion 173. For example, the cross-section of the inverter connector 117 can be formed in a 'C' shape. The concave groove 109 is formed inside the inverter connector 117 and a circular spring structure (not shown) is disposed at the concave groove 109. The spring disposed at the concave groove 109 holds the protrusion 173 of the inverter substrate 170 to prevent the escape of the inverter substrate 170 from the inverter connector.

Figure 11:
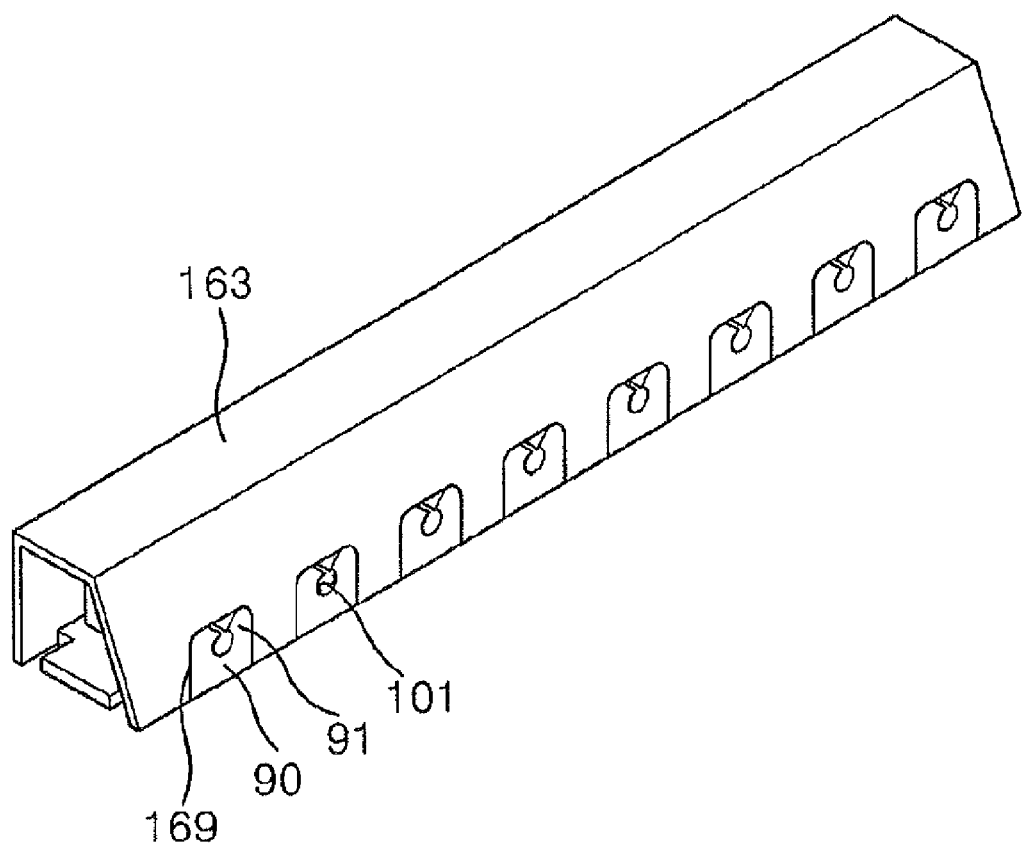
FIG. 11 is a perspective view showing a coupling state between a lamp socket and a side mold according to an exemplary embodiment of the present invention.

FIG. 11 is a perspective view showing a coupling state between a lamp socket and a side mold according to an exemplary embodiment of the present invention.

Referring to FIG. 11, the side mold 163 includes a plurality of grooves 169 formed at one side wall thereof to encircle the outer periphery of the lamp support portion 91. Since the side mold 163 securely fixes the lamp support portion 91, the lamp cannot escape from the support groove to prevent separation of the lamp from the lamp socket. Since each groove 169 encircles the outer periphery of the lamp support portion 91, a gap between the groove 169 and the lamp support portion 91 is minimized. As such, introduction of foreign substances into the side mold 163 can be blocked.

Figure 12A:
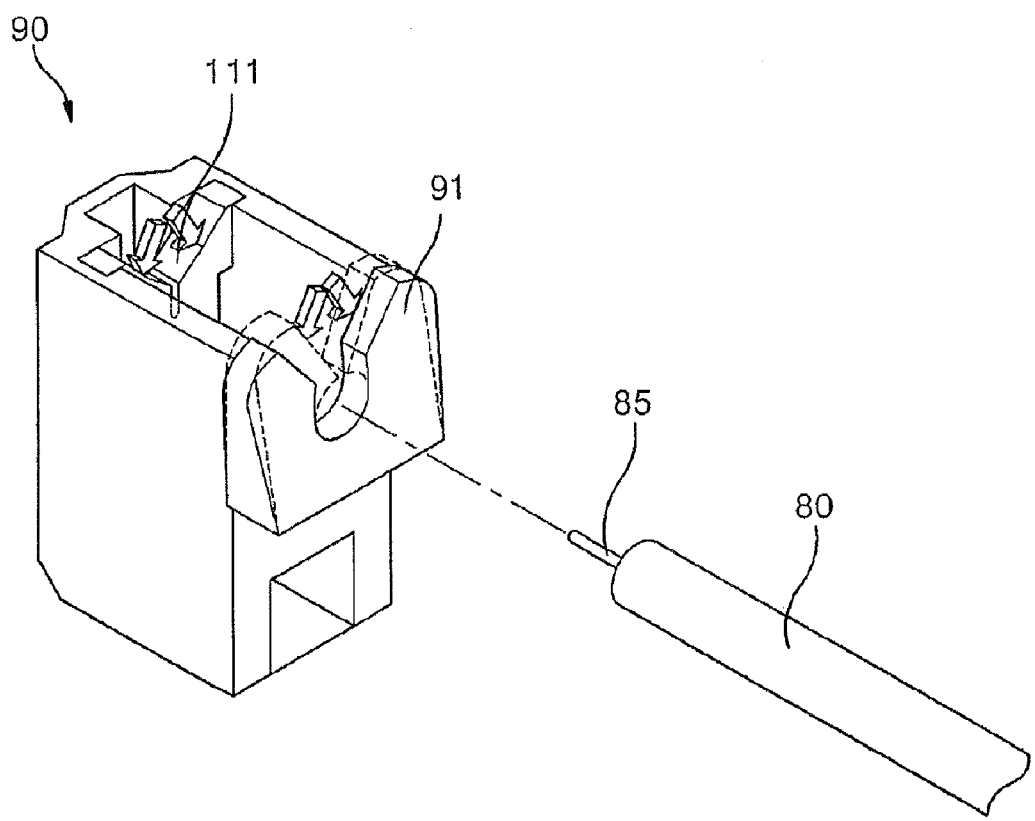
FIGS. 12A and 12B are perspective views showing a process where a lamp is coupled to a lamp socket according to an exemplary embodiment of the present invention.
Figure 12B:
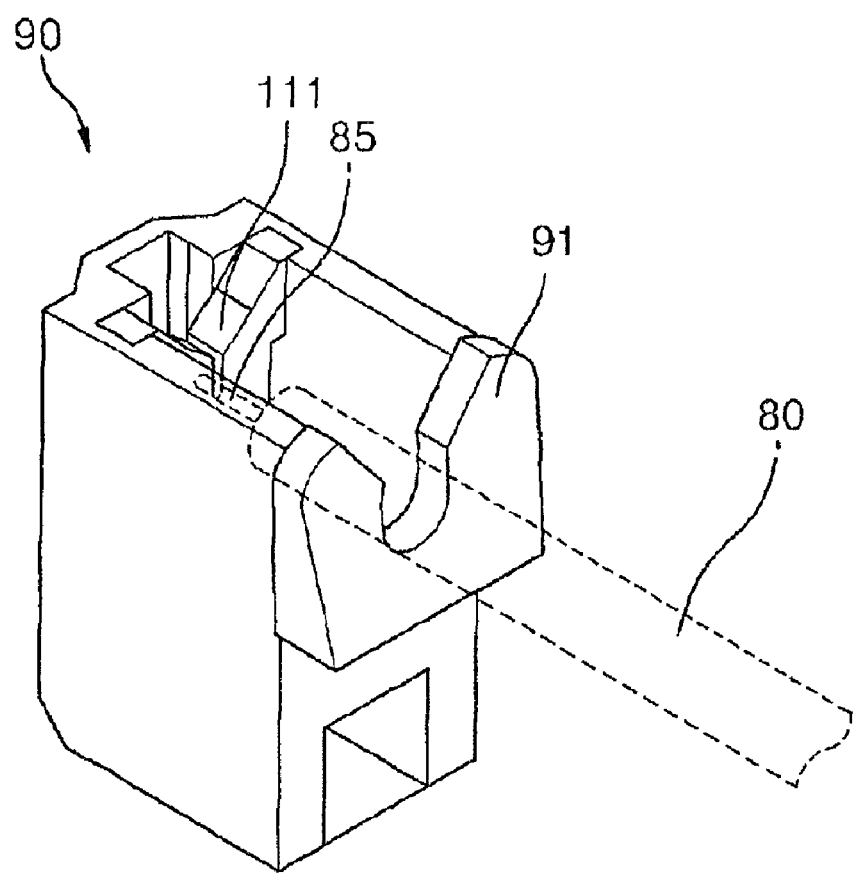

An assembling process of the backlight assembly is described hereinafter with reference to FIGS. 6, 12A and 12B according to an exemplary embodiment of the present invention.

Referring to FIG. 6, the backlight assembly is closed at a lower surface thereof and is opened at an upper surface thereof. Then, the reflective sheet 150 is mounted on the bottom chassis 160 having the mounting recesses 167. The lamp socket 90 having the power supplying member 110 is mounted to the mounting recess 167 of the bottom chassis 160. Thereafter, the lamp 80 is inserted into the lamp socket 90. In an exemplary embodiment, when a force is exerted to the lamp support portion 91 and the lamp connector 111 of the power supplying member 110 in an arrow direction as shown in FIG. 12A by using a tool, the lamp support portion 91 and the lamp connector 111 are widened laterally at both sides thereof, respectively. Then, as shown in FIG. 123, the lamp and lamp lead wire 85 are fittingly received in the holding groove of the lamp support portion 91 and the fixing groove of the lamp connector 111, respectively. When the tool disposed at the lamp support portion 91 and the lamp connector 111 is removed, the power supplying member 110 having elasticity returns to its original state. The protrusion 173 of the inverter substrate 170 is coupled to the inverter connector 117 of the power supplying member 110 in a slidable coupling manner. In an exemplary embodiment, the slidable coupling manner refers to a method in which the protrusion of the inverter substrate is fittingly coupled to the inverter connector while passing through the entrance of portion of the inverter connector to be encircled by the inverter connector. Then, the inverter substrate 170 is securely fixed to the inverter connector 117 using the spring installed at the concave groove 109. Thus, the lamp 80 and the inverter substrate 170 are electrically interconnected without soldering, which leads to simplicity of the coupling between the lamp 80 and the lamp socket.

The movement-preventing member 190 disposed at the bent portion 89 of the lamp 80 for preventing any movement of the lamp is fastened to the bottom chassis 160. The movement-preventing member 190 securely fixes the lamp 80 to prevent the lamp 80 from escaping from the lamp socket 90. The escape may result in interruption of the supply of power to the lamp 80. The side mold 163 having the grooves 169 is mounted on the lamp support portion 91 of the power supplying member 110 to encircle the outer periphery of the lamp support portion 91. The optical sheet element 70 is mounted on the side mold 163 and the bottom chassis 160 and then the mold frame 60 is covered on the optical sheet element 70.

According to an exemplary embodiment of the present invention, a lamp and an inverter are directly interconnected through a power supplying member comprising an elastomer mounted in a lamp socket, thereby simplifying a process of fixing the lamp to the lamp socket, reducing an assembling time of the lamp and the lamp socket and saving labor cost.

Since the power supplying member comprises an elastomer, the manufacturing cost of the liquid crystal display device can be reduced. According to an exemplary embodiment of the present invention, the width of fixing groove and a connection passageway of the power supplying member can be smaller than the diameter of a lamp lead wire to prevent the lamp lead wire from being escaped from the lamp socket.

Although the illustrative embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A backlight assembly comprising:
    a lamp receiving a power to generating light, and having a lead wire;
    an inverter mounted on an inverter substrate, wherein the inverter supplies the power to the lamp;
    a lamp socket including a body receiving the lamp and a power supplying member comprising a conductive elastomer to electrically interconnect the lamp and the inverter substrate, wherein the power supplying member comprises a pair of coupling projections coupled to the body, a lamp connector connected with the lead wire of the lamp disposed inside the body, and an inverter connector formed integrally with the lamp connector and connected to the inverter substrate; and
    a bottom chassis receiving the lamp and the lamp socket, wherein the inverter substrate is disposed below the bottom chassis and the bottom chassis has a mounting recess to mount the lamp socket therein.

2. The backlight assembly according to claim 1, wherein the conductive elastomer includes a silicon compound and a carbon material.

3. The backlight assembly according to claim 1, wherein the power supplying member comprises a chassis connector connected to the lamp connector and the bottom chassis.

4. The backlight assembly according to claim 1, wherein the lamp is formed in a linear shape, and comprises a first lamp lead wire connected to the inverter and a second lamp lead wire connected to the bottom chassis, the second lamp lead wire being disposed opposite to the first lamp lead wire.

5. The backlight assembly according to claim 1, further comprising side molds including a plurality of grooves formed on an inner wall thereof to fix the lamp.

6. The backlight assembly according to claim 1, wherein the lamp is formed in a 'U' shape, and comprises a lamp lead wire connected at one side to the power supplying member of the lamp socket and a bent portion formed at the other side of the lamp lead wire in a round shape.

7. The backlight assembly according to claim 6, further comprising a movement-preventing member including a fitting hole formed at an upper portion and a support stand formed at a lower portion thereof.

8. The backlight assembly according to claim 1, wherein the body comprises:
    a pair of coupling indents coupled to the pair of coupling projections of the power supplying member;
    a lamp support portion having a holding groove formed therein for mounting a part of the lamp; and
    a protective portion connected to the lamp support portion encircling the lamp connector.

9. The backlight assembly according to claim 8, wherein the body further comprises an inverter support portion extending integrally downwardly from the protective portion, the inverter support portion encircling the inverter connector.

10. The backlight assembly according to claim 8, wherein the body comprises silicon rubber or polycarbonate.

11. The backlight assembly according to claim 1, wherein the inverter substrate comprises a protrusion,
    the inverter connector is formed integrally with the lamp connector and connected to the protrusion of the inverter substrate.

12. The backlight assembly according to claim 11, wherein the inverter connector fixes the protrusion of the inverter substrate by encircling the protrusion.

13. The backlight assembly according to claim 12, wherein the inverter connector comprises:
    an entrance portion receiving the protrusion of the inverter substrate; and
    a concave groove formed inside the inverter connector having a spring therein for holding the inverter substrate.

14. The backlight assembly according to claim 1, wherein the lamp connector comprises:
    a fitting portion allowing the lamp lead wire to be fit therein;
    a fixing groove receiving the lamp lead wire; and
    a connection passageway positioned between the fitting portion and the fixing groove to guide the lamp lead wire from the fitting portion into the fixing groove.

15. The backlight assembly according to claim 14, wherein the power supplying member has a 'T' shape, and the fixing groove is provided at an upper portion of the power supplying member and is an opening in a shape of a slit.

16. The backlight assembly according to claim 14, wherein the width of the connection passageway is smaller than that of the fixing groove.

17. The backlight assembly according to claim 16, wherein the width of the connection passageway is smaller than that of the lamp lead wire by about 0.25 mm to about 0.35 mm, and the width of the fixing groove is smaller than that of the lamp lead wire by about 0.1 mm to about 0.2 mm.

* * * * *